United States Patent Office 3,049,558
Patented Aug. 14, 1962

3,049,558
MANUFACTURE OF TETRAMETHYLLEAD
Shirl E. Cook and Thomas O. Sistrunk, Baton Rouge, La., assignors to Ethyl Corporation, New York, N.Y., a corporation of New York
No Drawing. Filed Apr. 29, 1959, Ser. No. 809,609
6 Claims. (Cl. 260—437)

This invention relates to the manufacture of tetramethyllead. More particularly, the invention relates to a new and highly useful process for producing this material by the reaction of methyl chloride and a sodium lead alloy.

The organocompounds of lead have long been known to exert profound antiknock activity in the operation of internal combustion engines using gasoline as fuels. Despite this general knowledge, for many years the only commercially significant organolead compound employed for this purpose has been tetraethyllead. The reasons for the confinement of usage to tetraethyllead have been numerous, but principally these include ease of manufacture and the fact that the gasolines heretofore employed in commerce have been satisfactorily susceptible to improvement in the antiknock quality by addition of tetraethyllead. In recent years, the chemical and mechanical performance characteristics of gasoline stocks have undergone some alteration, and in particular, with the growing employment of particularly high compression engines, and particularly engines of relatively high normal speeds, a significant need has arisen for an improved organolead antiknock. It has been discovered that tetramethyllead has profound utility in certain high grade type gasolines of the premium character. Accordingly, a significant need has arisen for tetramethyllead for antiknock purposes.

It has long been believed that tetramethyllead can be generated by the reaction of methyl chloride with a sodium lead alloy. However, whereas the reaction of ethyl chloride with sodium lead alloy has been very successfully conducted for a number of years, there has been no successful operation of the methyl chloride-sodium lead alloy reaction. Attempts to manufacture tetramethyllead in this fashion has given rise to great difficulties with respect to practical operations of any commercial significance. These difficulties arise from various factors as outlined below:

Firstly, methyl chloride is a very volatile material with respect to ethyl chloride at comparable temperatures. Illustrative of this factor, the following table shows the vapor pressures of methyl chloride and of ethyl chloride at certain typical representative temperatures:

| Temperature, °F. | Vapor Pressure, p.s.i.g. | |
|---|---|---|
| | Methyl chloride | Ethyl chloride |
| 100 | 135 | 35 |
| 150 | 225 | 77.5 |
| 200 | 400 | 146 |
| 250 | 670 | 252 |

It is quite clear that when operating a reaction system having substantial quantities of liquid methyl chloride therein, that greatly increased pressure capacities will be essential relative to an ethyl chloride reaction, at comparable temperatures. Another difficulty heretofore experienced, in attempts to manufacture tetramethyllead, has been the fact that significantly higher temperatures have been necessary for any realistic degree of reaction in reacting methyl chloride and sodium lead alloy. In fact, prior patents indicate that even with temperatures of over 100° C. (212° F.) the reaction is very slow. For example, yields of only 25 percent have been reported for 50 hours' contacting with methyl chloride at 150° C. These factors have greatly mitigated against any successful operation for the production of tetramethyllead. In fact, tetramethyllead has never been produced commercially. When attempts have been made to utilize prior techniques, analogous to those used in the manufacture of tetraethyllead, for the production of tetramethyllead, these efforts have met with failure as will be clear in illustrative examples hereinafter.

It is clear that a great need has existed for an efficient, readily controlled, and readily reactive or rapidly performing reaction for the synthesis of tetramethyllead from a sodium lead alloy and methyl chloride. Further, a need has particularly existed whereby tetramethyllead can be made and recovered at relatively low pressure, by an easily controlled reaction, and by safe operating techniques.

A primary object of the present invention is to provide a new and highly efficient process for the manufacture of tetramethyllead by the reaction of a sodium lead alloy and methyl chloride. A more particular object is to provide a tetramethyllead process which results in substantial production with high yields, with relatively short reaction times when carried out in a batch type operation or technique. A more specific object is to provide an operating technique for a batch cycle operation which is readily and effectively controlled and permits operation at relatively modest and easily controllable pressures. Yet another object of certain embodiments is to provide a technique particularly susceptible of continuous operation resulting in high output for a given reaction space along with high and sustained yields. An additional object is to provide a method whereby the product tetramethyllead is protected against decomposition not only during manufacture but during recovery from a reaction product mixture. A further object is to provide a catalyzed methylation of the lead of a lead sodium alloy, with methyl chloride, which permits the initiation and sustaining of a high rate of reaction without danger of a runaway or non-controlled reaction. An additional and more specific object is to provide a process which results in a reaction product mixture wherein the tetramethyllead is produced as a blend with a highly desirable material particularly suitable for addition to gasoline stocks. Other objects will appear hereinafter.

The present invention, in its broadest form, comprises carrying out a catalyzed reaction of a sodium lead alloy with methyl chloride and in the presence of a hydrocarbon liquid which is inert to the reacting materials at the conditions of operation. The inert liquid is provided in proportions such that the rapidity of reaction is, surprisingly, not significantly decreased. In fact, the presence of the inert hydrocarbon liquid, in the present process, makes possible, in preferred forms of the process, a reduction in reaction time necessary to provide a high yield. The hydrocarbon liquid used should, desirably, include at least a portion which boils at or above 110° C., and, very desirably, only minor portions should boil below 110° C. The hydrocarbon is used in restricted proportions of from as low as 5 to about, usually, not over 25 parts by weight to 100 parts of lead in the alloy, and also, in proportions of less than 50 volume percent of the methyl chloride employed. A highly preferred proportion is about 10 or 11 percent of the weight of the lead present. Frequently an internal lubricant or additive consisting of powdered graphite is also employed in the reaction mixture, but this is not required.

The methyl chloride employed in the reaction is provided in excess quantity, and, in addition, sufficient methyl chloride is provided to assure that the vapor space of the reaction system, including associated conduits or heat transfer devices, are filled with methyl chloride vapor.

For example, a ratio of, about 1.2 theories or more, of methyl chloride is customarily used, plus the indicated quantity of methyl chloride to occupy as vapor the freeboard space of the reaction zone and associated space. Methyl chloride can be introduced in various ways. One method involves feeding methyl chloride during a finite period during which the alloy is already at reaction conditions. Another mode of addition involves charging the entire quantity of methyl chloride at ambient or room temperatures, that is, prior to implementing the reaction. In the reaction cycle, following such a procedure, a charge is provided including the sodium lead alloy, the required proportions of the hydrocarbon liquid, and catalyst as described hereinafter. In addition, methyl chloride liquid is introduced in the proportions of about 1.2 times the theoretical requirements for 100 percent conversion of the lead of sodium lead alloy plus sufficient methyl chloride to occupy the vapor space. The reaction mixture thus formed is agitated and concurrently the contents of the reaction zone are increased in temperature by external heating. The reaction commences at about 50° C. or in that general neighborhood, but the temperature is increased further by continued heating, and also by the heat generated by the reaction, and then is controlled to provide a mean temperature of the order of from about 70 to 130° C., a preferred mean temperature being from 85 to about 110° C. By mean temperature is meant the arithmetic average of the reaction temperature during a reaction period. However, final temperatures, or even temperatures during certain periods of the reaction can arise appreciably above the indicated mean, that is up to temperatures of about 130–140° C. or even higher. The pressures of operation in carrying out the reaction as described above are also considerably variable, corresponding to the autogenous temperature of the reaction system. Generally, it is found that a pressure of 180 to about 250 pounds per square inch gauge is eminently satisfactory, in contrast to pressures of over 600 pounds per square inch which would be experienced if the reaction could be conducted solely between liquid methyl chloride and sodium lead alloy. During the course of a batch or cyclic reaction, the temperature usually is allowed to rise from 15–30° during the course of reaction. As the reaction is substantially completed, the further rise terminates and the temperature begins to drop. The actual reaction period necessary in a cyclic operation, or the contact time in a continuous embodiment, is relatively short, that is, of the order of 5 to 7 hours or less. The significance of the present method is appreciated by contrast with the 50 hours or more heretofore required for yields of only 25 percent.

The foregoing outline of the process is particularly applicable to batch type operations characterized by cyclic reaction of the methyl chloride and sodium lead alloy. The benefits of the present invention are highly applicable and beneficial in continuous processes in addition. Continuous processes are generally characterized by the continuous feed of the desired reactants to a reaction zone maintained at more or less steady state conditions for conducting the reaction. Concurrently, a similarly steady, or at least repetitive and intermittent stream is withdrawn, including the products of the reaction. The present invention is equally beneficial for the various types of such continuous operations.

The advantages and benefits of the present invention will be readily understood from the examples and further detailed description following. As previously mentioned, a surprising benefit of the present invention is that the presence of the relatively high boiling inert hydrocarbon material, in the synthesis of tetramethyllead, does not, contrary to expectations, seriously or adversely affect the formation of the desired product. This discovery is illustrated by the following example.

*Example I*

A series of small scale reactions were carried out between comminuted, solid monosodium lead alloy, NaPb, and methyl chloride. The reaction technique employed was as follows: 40 parts of monosodium lead alloy, enclosed in a glass bulb, was charged to a reaction vessel. In addition a small amount of an aluminum type catalyst was charged, and about 65 parts of methyl chloride, this proportion corresponding to about a six-fold excess of methyl chloride over theoretical requirements. Further, various proportions of toluene were introduced as illustrated in the data given below. The reactor was then sealed, immersed in a constant temperature bath to raise the contents to reaction temperatures, and the bulb of alloy was broken by vigorous agitation of the autoclave and contents. After exposing the autoclave contents to reaction temperatures for timed periods of five or ten minutes, the reactor was removed from the bath and quenched in ice water to terminate the reaction. The reactor was then opened, and the contents mixed in an organic solvent for extraction of tetramethyllead product obtained, an aliquot of the liquid phase being removed and analyzed. The following results were obtained:

| Run | Catalyst | Inert liquid | Reaction conditions | | Yield, Percent |
|---|---|---|---|---|---|
| | | | Time, min. | Temp., °C. | |
| 1 | (CH₃)₃Al₂Cl₃, 1 part. | 4.3 parts toluene. | 5 | 88 | Av. 16.6. |
| 2 | ___do___ | ___do___ | 10 | 88 | Av. 36.9. |
| 3 | ___do___ | ___do___ | 5 | 115 | Av. 8.4. |
| 4 | ___do___ | ___do___ | 10 | 115 | Av. 24.4. |

From the foregoing, it will be seen that the rate of reaction of methyl chloride and alloy is not seriously affected, or, if affected, is benefited in that the reaction is smoother and more readily moderated. In commercial operations, as will be clear from examples below, it is found virtually impossible to carry out a cyclic operation, in any reasonable length of time, by reacting solely sodium lead alloy and methyl chloride.

To further illustrate the operation of the present invention in a commercial type operation, the following operations illustrate typical procedures and benefits.

*Example II*

In the following operations an autoclave was employed which was fitted with an internal agitator and a jacket for circulating a heat transfer fluid. In addition, vapor and liquid return lines, to a condenser, provided for condensing and reflux of liquid as desired.

The autoclave was charged with monosodium lead alloy flakes in the proportion of approximately 22 pounds per cubic foot of reaction space. In addition, approximately 5 percent by weight, based upon the alloy, of graphite was introduced as a reaction lubricant, plus approximately 0.2 percent of aluminum, as trimethyl aluminum. Toluene, in the proportions of 10 percent of the alloy weight, was introduced. The reactor and contents was heated to approximately 80° C., and a feed of liquid methyl chloride was then started at a rate of about 10 parts per minute per 100 parts of alloy charge. Reaction occurred promptly, as shown by a further significant rise in operating temperature. The pressure was also allowed to rise to 180 p.s.i.g., and at this time reflux of vapor, principally methyl chloride, was initiated to maintain the pressure at this level. The temperature of the reacting mixture was thus controlled in the range of 95 to about 80° C. by variation of the degree of cooling for refluxing purposes. The methyl chloride feed was continued until a total of approximately 58 pounds by weight per 100 parts by weight of alloy charged had been introduced, this corresponding to approximately 160 percent excess of the theoretical requirement. The reaction conditions continued for several hours after termination of the feed, and then the temperature stopped rising and began to drop slightly. The excess pressure was vented shortly thereafter and the autoclave contents cooled to approximately ambient temperatures. The charge was then discharged from the autoclave into a pool of water in a steam distillation vessel, and the tetramethyllead and toluene were recovered in high yield.

The example below illustrates a further illustration of batch application of the present invention wherein an appreciably larger quantity of material was processed and the excess of methyl chloride was considerably reduced.

*Example III*

In this operation, substantially the same procedure was employed as in Example II above, except that the sodium lead alloy was charged in the proportions of about 40 pounds per cubic foot of reaction volume. In addition, the reactor was charged with toluene in the proportions of about 10 parts per 100 parts of the alloy, and trimethyl aluminum in proportions providing about 0.2 weight percent aluminum based on the sodium lead alloy. The autoclave and contents were heated to about 90° C., and then methyl chloride feed was initiated. Reaction started almost immediately and the pressure rose rapidly, condensation of vapor and reflux being started by condenser cooling at about 130 pounds per square inch pressure. The bulk of the reaction was conducted at a pressure of about 210 pounds per square inch gauge. The temperature during the feeding and the reaction zone was readily controlled in this manner, rising in one short period to about 113° C., but the mean temperature was about 100° C. Upon termination of the reaction, the reacted mixture was discharged from the autoclave to a steam distillation operation, and a yield of approximately 70–75 percent of tetramethyllead was obtained, admixed with about 30 weight percent toluene. The operation during the entire reaction period was smooth and readily controlled.

By way of contrast with the foregoing illustrations of the present invention, when the operation of Example III above was repeated, except that no inert liquid was added as a component of the charge, the pressure of reaction rose so rapidly that control was extremely difficult. In fact, the pressure continued to rise, with feeding of methyl chloride, to a pressure of about 360 pounds per square inch and it was necessary to vent the reactor to relieve the pressure condition. Because of this venting, the recovered yield of tetramethyllead was significantly lower. However, the most important factor was the necessity of venting the pressure intermittently to allow control of the internal pressure in the reaction system, which is obviously a non-operable operation. In repetitions of this operation, with and without the use of a reflux of vaporized methyl chloride, in at least 50 percent of the operations, repetitive venting was required for the indicated purpose. Hence, it is clear that attempts to produce tetramethyllead by a reaction involving only sodium lead alloy and methyl chloride, even in the presence of a catalyst, is virtually inoperable as a practical operation.

The foregoing operations show that the present operating technique permits a safe, readily controlled and efficient reaction of methyl chloride with sodium lead alloy to produce tetramethyllead at only relatively moderate pressures. In addition, despite the presence of an inert hydrocarbon liquid, which would be expected to drastically slow down the rate of reaction, the overall period of reaction in batch operations, the desired reaction can be carried out by relatively short, efficient cyclic operations. In addition, there is no necessity of venting of the reaction zone, except for discharge of minor amounts of non-condensable alkane hydrocarbon by-products.

*Example IV*

In this operation the alloy was charged to an autoclave in proportions of 57 pounds per cubic foot of reaction space. In addition, and at the start of the cycle, a mixture of toluene and methyl aluminum sesquichloride catalyst was charged to the reactor, in the proportions of 10 parts of toluene per 100 parts of alloy and methyl aluminum sesquichloride in the proportions of about 0.8 part based on 100 parts of alloy. Further, methyl chloride liquid, in the proportions of 94 pounds per 100 parts of alloy was fed at the very start. This charge corresponded to proportions of about 4.3 times the stoichiometric requirements of the reaction.

The vessel was then heated by circulating hot water at 85° C. through a jacket, while agitating the contents. The temperature was raised to about 70° C. and reaction started smoothly and continued without any difficulty of control, until the reaction was essentially complete. The temperature of the reacting mixture during this period rose from 70° C. to 100° C., the mean temperature being 85° C. The pressure of operation during the reaction period was maintained at about 205 per square inch, gauge.

At the termination of the reaction, the excess pressure was vented and the autoclave charge was cooled by circulating a cooling medium in the jacket. The contents were then discharged and subjected to a steam distillation, and a yield of about 70 percent tetramethyllead was obtained, accompanied by toluene in a concentration of about 35 percent.

The foregoing technique, i.e., introducing the entire charge of methyl chloride upon starting the reaction cycle, is also fully applicable to appreciably lower proportions of the methyl chloride reactant, as shown by the following example.

*Example V*

The same procedure as employed in Example IV, above, was used in charging the autoclave, except that the methyl chloride was introduced in the proportions of 30.6 parts of methyl chloride per 100 parts of the monosodium lead alloy. This proportion corresponds to 1.26 stoichiometric requirements, plus sufficient methyl chloride to occupy as vapor the vapor space of the autoclave and associated vapor condensing equipment. After charging, the autoclave and contents were heated by circulating hot water through the jacket and the temperature was raised to about 66° C. at which time cooling of the reflux condenser was initiated. The pressure was controlled, by refluxing of liquified vapors, at about 170 p.s.i.g. Reaction occurred very smoothly and the temperature continued to rise at a reasonable rate up to as high as 118° C., the mean temperature being at or slightly above 90° C. After several hours' reaction with easy control, the autoclave and contents were cooled and excess pressure was vented. The reacted charge was discharged and steam distilled. A high yield, of the order of about 65 percent tetramethyllead, accompanied by about 35 weight percent of toluene was recovered.

In all the foregoing operations, the cyclic operations required less than six hours, or only a small fraction of the reaction period which would previously have been required.

As heretofore indicated, the technique of the present invention is highly applicable to continuous operations as illustrated by the example below.

*Example VI*

In this operation, the reaction zone is a vertical autoclave having a hemispherical bottom and a vertically mounted agitator projecting into the reaction zone and capable of being rotated at a high rate of speed to provide vigorous agitation. During continuous operation, feed materials were fed to this reaction zone in the following proportions:

| | |
|---|---|
| Monosodium lead alloy | 100 |
| Methyl chloride | 200 |
| Toluene | 20 |
| Aluminum chloride | 0.2 (Al) |

The reacting materials within the reaction zone were vigorously agitated, but for a power input level such that there was a distribution of unreacted alloy concentrated at the bottom of the zone, with reacted solids tending to concentrate at the top of the zone. By reacted solids is meant sodium chloride by-product of the reaction and unreacted lead. From an upper portion of the zone a product stream was withdrawn having the following compositions:

| | |
|---|---|
| Tetramethyllead | 7.5 |
| Methyl chloride | 57 |
| Toluene | 6 |
| Sodium chloride | 8 |
| Lead | 21 |

This product stream corresponds to a yield of approximately 75–80 percent of the alloy feed. The solids are separated by filtration or similar operations, and the methyl chloride component is vaporized off leaving a tetramethyllead product containing approximately 45 percent toluene.

In this operation the alloy feed can be provided in the form of subdivided, highly reactive flakes. Alternatively the alloy can be introduced as a molten liquid. The toluene can be blended with the methyl chloride feed externally of the reactor, or alternatively can be introduced as a separate liquid stream. The reaction zone is maintained at a temperature of about 85 to 90° C. and under autogenous pressure.

From the foregoing examples it will be clear that the method of the invention is susceptible to a significant variety of operating techniques. For example, the proportion of inert hydrocarbon liquid, or the specific identity, can be appreciably varied.

*Example VII*

When Examples II through IV are repeated, except that the toluene is introduced in the proportions of about 20 percent, based on the alloy, similar results are achieved, except that the average temperature of operation is slightly higher.

When the conditions of operation of Example V are used, the toluene or other inert hydrocarbon should not be used in proportions significantly above 11 or 12 weight percent of the alloy, in order to be below the preferred upper limit of 50 volume percent of the methyl chloride provided.

In addition to operation at higher concentrations of inert hydrocarbon, as exemplified above, perfectly satisfactory results are achieved when the hydrocarbon is substantially reduced in concentration, as illustrated by the following example.

*Example VIII*

Generally, the same procedure as described in Example II was followed, the loading of the reaction zone or autoclave being about 37 pounds of alloy per cubic foot. Instead of providing toluene in the proportions of about 10 parts to 100 parts of alloy, however, the concentration was lowered to about only 7 parts per hundred parts of alloy. The catalyst employed was in the proportions of .44 part of trimethyl aluminum per 100 parts of alloy. Upon raising the temperature by external heating, and feeding methyl chloride in the proportions of about 1.6 times theoretical requirements, very efficient operation was obtained, the pressure being stabilized at 180 pounds per square inch gauge, and the temperature rising and being controlled at a maximum level of about 110° C., and a minimum temperature of about 85–90° C. After reaction, the reacted mixture was discharged and steam distilled and a high yield of 70 percent tetramethyllead was achieved, accompanied by the toluene employed.

If desired, as previously indicated, the inert hydrocarbon concentration can be even slightly lower than in this example, proportions of as low as about 5 parts per 100 parts of lead being quite operable. However, the best results are usually provided when a concentration of at least 10 pounds per 100 pounds of lead is used.

*Example IX*

When Examples II through V are repeated, except that, instead of toluene, either 10 or 20 percent of 2,2,4-trimethyl pentane (isooctane) is substituted for the toluene. Similar results are achieved, except that the temperature of operation at comparable pressures are slightly lower than in the case of the foregoing examples using toluene. In addition, when a low excess of methyl chloride is used, as in Example V, the upper limit of the amount of iso-octane should be reduced, desirably, to not over about ½ the liquid volume of the methyl chloride reactant.

Instead of pure hydrocarbon compositions, mixtures or blends can be employed, and in some cases are preferred, as shown by the following example.

*Example X*

The procedure of Example II through V is repeated in operations wherein, instead of toluene, an aromatic type solvent is employed having an initial boiling point of about 100° C. and a final boiling point of about 130° C. Similar yields and ease of operation are attained, and the tetramethyllead is accompanied during steam distillation recovery, by a satisfactory concentration of the solvent components. Similar results are achieved in the foregoing operations. It is also observed that a more uniform distribution of inert liquid is observed, accompanying the tetramethyllead product, during the steam distillation, than is obtained when using a pure iso-octane diluent material.

*Example XI*

Repeating the procedures of Examples II through V, except that instead of trimethyl aluminum or methyl aluminum sesquichloride, comparable amounts of the following catalysts are substituted: dimethyl beryllium, zinc-copper alloy or couple, boron trifluoride, phosphorus, arsenic, aluminum bromide, aluminum iodide, aluminum chloride, trimethyl boron and combinations of these, including metallic aluminum as a component. Similar results are attained with these catalysts. Numerous others in the corresponding groups of the periodic table will be effective. In addition to use of catalysts in the cyclic operations as described in Examples II–V, the catalyst can be similarly employed in continuous operations, as in Example VI.

The process of the present invention is fully applicable to reactions with sodium-lead alloys higher in sodium than the monosodium alloy as shown in the following example.

*Example XII*

The procedure followed in Example IV is followed, generally, except that an alloy containing 20 weight percent sodium is used. The charge to the reactor consists of 100 parts alloy
63 parts methyl chloride
15 parts toluene
2 parts trimethyl aluminum The quantity of methyl chloride used amounts to 1.4 theories, plus a slight excess to occupy the free space in the reaction system. After charging these reactants, the autoclave and contents are heated to suitable temperatures to begin reaction, and the bulk of the reaction is carried out at approximately 100° C. and a pressure of about 190 pounds. After completion of the reaction, the reacted mixture is discharged and the tetramethyllead is steam distilled, a high yield being accompanied by about 25 percent toluene.

One of the particular beneficial effects of the present invention is the fact that a highly stable reaction and product system is achieved and maintained. It is found that the inert materials employed in limited quantity in the present process, and particularly, those compounds or mixtures having a high degree of aromaticity, are highly effective in inhibiting the decomposition of tetramethyllead. The following data illustrate clearly the magnitude of this benefit. A series of operations were conducted in which specimens of pure tetramethyllead, or tetramethyllead with defined quantities of inert liquids were subjected to a procedure designed to cause decomposition, and allow measurement of the rapidity and/or severity of the decomposition. This procedure involved inserting the specimen in a closed steel vessel having a wire passing through the interior and through the specimen proper. The wire was then heated by passing electrical current therethrough. The temperature of the specimen was also measured. Recording pressure devices, in some cases of the oscilloscope type, were employed to provide a clear and accurate record of the time-pressure history. In a series of operations of this character, the following results were obtained:

| Specimen | Initiation Temperature | Maximum Temp. | Maximum pressure | Decomposition time |
|---|---|---|---|---|
| Pure TML | 105 | 265 | 1,030 | About 0.1 sec. |
| TML + 25 wt. percent toluene. | 105 | 165 | 100 | 50 sec. |
| TML + 20 wt. percent toluene. | 105 | 140 | 80 | 17.5 sec. |

The foregoing shows the effect of the presence of toluene on improving the stability of tetramethyllead. It is seen that an increase in stability of from 175 to 500, at least, in improvement is realized. Similar benefits were demonstrated when the decomposition of specimens was initiated by ignition caused by a thermite reaction. In these operations, a similar procedure was used, except that the electric wire was used to initiate a thermite reaction. The thermite reaction (iron oxide plus aluminum) provides a temperature of over 2000° C., so this technique provides a very drastic test. Results of these operations were as follows:

| Run | Specimen | Initiation Temp. | Max. temp. | Max. pressure | Decomposition time, sec. |
|---|---|---|---|---|---|
| A | 40 g. TML+30 ml. toluene. | 100 | 230 | 360 | 7.5 |
| B | 40 g. TML+20 ml. styrene. | 105 | 335 | 1,275 | 3 |
| C | 40 g. TML + 20 ml. iso-octane. | 105 | 125 | 410 | 25 |

From the above, it is seen that the presence of the hydrocarbon solvents results in improvement in the stability of from 30 to 250 times the stability of tetramethyllead alone.

Similar results are achieved when, instead of determining the rate of decomposition of a tetramethyllead product which has been separated from the other components of the reaction, a determination is made of the reacted mixture (reaction mass) prior to separation. Tests have shown that the rate of decomposition is reduced by a factor of at least about 4 and usually over 6. Hence, the present invention provides a high degree of effectiveness during the reaction as well as during subsequent separation and after segregation of the tetramethyllead product.

The foregoing shows the great degree of improvement in stability even when the specimen is subject to the severe shock of a thermite type reaction. A highly significant benefit in the present operation is that it assures that the inert liquid is in the presence of the tetramethyllead from the moment it is synthesized and remains with, or accompanies the product, during recovery operations. The most effective recovery operations involve a partial pressure operation to isolate a tetramethyllead product fraction. Hence, it is of importance that the volatility of the inert liquid be in the neighborhood or approaching the volatility of tetramethyllead, at least with respect to some components thereof. Toluene, having a boiling point of 110.6° C. is ideal in this respect. However, commercial hydrocarbon streams, having a boiling range which overlaps the normal boiling point of tetramethyllead, are quite acceptable. These may be paraffinic or aromatic in character, the solvents having a high degree of aromaticity being highly preferred.

The tetramethyllead product provided by the foregoing examples is an extremely effective antiknock component or additive for modern gasolines. In fact, the presence of the inert hydrocarbon liquid provides a highly desirable component of an antiknock liquid, providing a component of high antiknock value in itself and also being itself particularly susceptible to antiknock or octane number improvement.

When desired, the tetramethyllead can be isolated, or concentrated from, the inert hydrocarbon liquid. This is, ordinarily not required, and is most readily done when the inert liquid hydrocarbon is a relatively narrow boiling material boiling 5 or 10° C., or more, above the tetramethyllead. In such instances, the tetramethyllead can be recovered as a concentrated fraction by a vacuum fractionation.

It will be clear from the foregoing examples and detailed description of operation, that the benefits of the present process can be obtained while varying, with considerable degree of freedom, the various conditions of operation.

The effectiveness of the process is not greatly sensitive to alloy composition, that is, it is not essential that the alloy correspond in composition to the compound NaPb, which contains 10 percent sodium. Rather, compositions of, for example, 8 to 20 weight percent sodium can be effectively used, although it is also found that the most efficient composition with respect to initiation and general rapidity of reaction, is the monosodium lead alloy, NaPb. The form of preparation of the alloy reactant is, similarly, not highly critical. Thus, the alloy may be prepared for reaction by solidifying in large slabs, and then breaking and further comminuting in grinding mills, generally as is disclosed in U.S. Patent 2,134,091. Alternatively, a highly effective method for preparing the alloy for the process involves the deposition of a thin layer of liquid or molten alloy on a rotating drum, and the rapid solidification thereof, followed by removal and comminuting to form thin, flake-like particles. This technique is described in U.S. Patent 2,635,107. Another highly effective mode of introducing alloy involves the feeding as a molten liquid, as drops which rapidly solidify upon contact with the liquid reaction mixture. This technique is useful in continuous embodiments wherein the total liquid phase is high relative to the solids present in the reaction zone. This technique is highly beneficial in maintaining a continuous reaction, as the initiation temperature of reaction is appreciably higher than in the reaction of alkyl halides of greater than one carbon atom in the alkyl group. When the alloy composition is different than monosodium alloy, and particularly if the difference is substantial, the stoichiometric requirements of methyl chloride are appreciably altered. Thus, when reacting an alloy having about 20 weight percent sodium, with methyl chloride, the requirements are approximately 44 parts of methyl chloride per 100 parts of alloy.

The methyl chloride is employed in excess, and as low as 5 or 7 percent excess have been employed satisfactorily. However, the preferred proportions are about 20 percent excess or over. The proportions of the inert liquid are, very desirably, not over 50 volume percent of the methyl chloride, so an overriding limitation on the process conditions is exerted when a low excess of methyl chloride is used. Thus, for a seven percent excess of methyl chloride (ignoring vapor required to occupy the free space), about 23.5 parts of methyl chloride are used per 100 of alloy. The inert hydrocarbon is then provided in the proportions of up to about 12 milliliters to 100 grams of alloy, or, in the case of toluene, in proportions of up to about 10.3 percent by weight of the alloy.

Substantial latitude exists with respect to the specific inert liquid employed. Although it is highly preferred that the boiling points of pure or individual compounds, when used, be in the range of 110° to 150° C., the process is quite effective with materials having boiling points as low as 90° C. When such liquids are used, somewhat greater care in the recovery operations is required, and, generally, the pressures of operation, at given mean reaction temperatures, are somewhat higher.

Exemplary of the inert liquid compounds which are highly satisfactory in the present operations are iso-octane, styrene, the xylenes, ethyl benzene, n-heptane, n-octane, nonane, 3-ethyl hexane, 2-methyl hexane, 3-methyl hexane, 2,6-dimethyl heptane, 4-ethyl heptane, the methyl heptanes, and others. Compounds having a minor degree of unsaturation are suitable, for example, the heptenes, the methyl hexenes, 2,5-dimethyl-3-hexene, and octene.

It is, generally, desirable that the components of an inert hydrocarbon liquid mixture be solely compounds containing only carbon and hydrogen. However, certain proportions of substituted hydrocarbon compounds are not fatal provided that the requisite with respect to inertness and the desired attributes of boiling points are added. Thus, the presence of oxygen containing compounds having substantially no active hydrogen can be permitted.

As previously stated, the hydrocarbon or organic liquid additive, employed during the course of the reaction and in the recovery is provided in the proportions of at least about 5 parts per 100 parts of lead of the alloy charged. It is found that this quantity is highly desirable for various reasons. Firstly, it is discovered that the presence of this proportion of organic material provides about the lowest practical concentration suitable for safely and rapidly conducting the reaction of the alloy and the methyl chloride. It is believed that the surprising effectiveness of the inert liquid during the course of the reaction is that it permits of solution of methyl chloride therein at a sufficiently high temperature so that the dissolved methyl chloride is available for reaction with the alloy at a substantial rate of speed. On the other hand, with the indicated proportion of inert liquid, the occurrence of "hot spots" within the reaction zone, or the unforeseen increase beyond desired levels of reaction temperatures, automatically results in a partial fractionation of the liquid phase and the distillation from the liquid phase of the methyl chloride component, thus substantially negating further reaction and preventing further temperature rises. With respect to the maximum proportions of inert liquid provided, the upper limit is of some importance. Thus, good results are obtained with as high as 20 to 25 parts of inert liquid. However, proportions used are relatively low compared with the volume of methyl chloride. The disadvantage to higher proportions is that no significant benefits are derived and, further, the reaction space and recovery equipment is thus reduced in capacity because of the space and heat transfer requirements of the superfluous solvent materials. Further, when the higher proportions of liquid are used, special provision must generally be made to provide additional heat to the reaction zone.

As shown above, a reaction catalyst is employed in virtually all forms of the process. The precise function of the catalyst is not fully understood, but a substantial number are available for the purpose. The aluminum materials are a highly preferred group of catalysts, and these are generally preferred in the proportions of about 0.2 weight percent of aluminum based upon the lead in the feed alloy. Typical examples of suitable catalysts include the halides of aluminum, such as aluminum chloride, aluminum iodide, and aluminum bromide, the alkyl compounds of groups II and III metals, generally, including, for example, dimethyl beryllium, diethyl zinc, triethyl gallium, triethyl aluminum, complex alumino hydrides, trimethyl aluminum, methyl aluminum sesquichloride, dimethylaluminum chloride, certain elements such as phosphorous and arsenic, and the boron alkyl compounds. When the catalyst is an organometallic compound having an alkyl group, it is highly desirable that the alkyl group comprise the methyl group inasmuch as it is found that the presence of alkyl groups, in the catalyst component, having two carbon atoms or more, results in the appearance within the product of the alkyl lead compounds of corresponding alkyl chain lengths. This is not desired, hence the employment of methyl organometallic compounds as catalysts, and especially the aluminum type catalysts, is generally preferred.

The catalyst can be added entirely at the initial charge of the alloy to the reaction zone, or, alternatively, it can be admixed with and provided with the methyl chloride when the latter reagent is fed over a finite period. As a general matter, the charging of the catalyst entirely at the start of a reaction, in batch operations, is preferred. Catalyst concentrations can be quite low, as already indicated above, and are generally employed in the proportions of about 1.5 atoms or moles of the catalyst to 100 atoms of lead in the alloy.

As previously stated the reaction conditions employed are susceptible of a great degree of variation without significantly altering the substantial benefits of the present invention. The pressure employed corresponds to the autogenous pressure of the reaction system, which in turn is dependent to some extent upon the relative quantities of methyl chloride provided plus the relative quantity of the inert organic material present. The reaction initiates, with the catalyst employed, at temperatures of as low as 50° C., but at such modest rates that no significant production is achieved in reasonable reaction periods. Accordingly, in virtually all forms of the process, the reaction temperature is increased to sufficiently high levels that the mean temperature of reaction in the reaction period is from about 70 to 130° C. The preferred mean temperatures of reaction are from about 85 to 110° C. Bulk temperatures above 160° C. during any portion of the reaction are to be avoided. The reason for avoidance is because it appears that the yield materially decreases at mean temperatures above this level, and in addition, the rate of degradation or decomposition of the product materially increases.

From the foregoing description and examples it is seen that the present invention is susceptible of numerous variations and adjustments, subject only to the limitations of the claims below.

We claim:

1. In the process of catalytically alkylating a sodium-lead alloy with methyl chloride, the improvement according to which methyl chloride is the only alkylating agent used, the alkylation is carried out in a liquid hydrocarbon having an atmospheric boiling point of from about 90 to 150° C., and being in proportions of from at least about 5 parts to 25 parts by weight per 100 parts of lead in the alloy charged, and less than 50 volume percent of the methyl chloride, the methyl chloride being fed in proportions of from about 5 percent excess plus sufficient methyl chloride to occupy as vapor the free space of the reaction system, to about 330 percent excess, the mean reaction temperature being from about 70 to 130° C., the reaction pressure being the autogenous pressure of the reactants and the reaction time being not more than about seven hours.

2. In the process of catalytically alkylating a monosodium-lead alloy with methyl chloride, the improvement according to which methyl chloride is the only alkylating agent used, the alkylation is carried out in a liquid hydrocarbon having an atmospheric mid boiling point of from 110 to 150° C. and present in the proportion of about 5 to 20 parts by weight per 100 parts of lead in the alloy charged, the methyl chloride being fed in the proportion of from about 20 percent excess, plus methyl chloride sufficient to occupy as vapor the free space of the reaction system, to about 160 percent excess, the mean reaction temperature being from about 70 to 130° C., the reaction pressure being the autogenous pressure of the reactants and the reaction time being not more than about seven hours.

3. The process for manufacture of a tetramethyl lead product comprising charging a reaction zone with a charge consisting essentially of monosodium lead alloy and an inert aromatic type hydrocarbon liquid having an atmospheric mid-boiling point of from about 110 to 150° C. and in the proportions of about 5 to 20 parts to 100 parts of lead, and an aluminum catalyst in the proportions of at least about two parts by weight of aluminum to 1,000 parts by weight of lead, said catalyst being selected from the group consisting of trimethyl aluminum, triethyl aluminum, methyl aluminum sesquichloride, dimethyl aluminum chloride, aluminum chloride, aluminum bromide, aluminum iodide, and aluminum, to a batch reaction zone, in the proportions of from about 20 to 60 pounds of lead per cubic foot of the space defined by the reaction zone, and heating and feeding methyl chloride only thereto in the proportions of at least about 20 percent excess plus sufficient methyl chloride to occupy as vapor the vapor space of the reaction zone, up to about 160 percent excess, reacting the methyl chloride and alloy at a mean temperature of 85 to 110° C., for a reaction period of not more than about seven hours to produce tetramethyllead, then discharging the so-formed reacted mixture and then concurrently steam distilling the tetramethyllead and hydrocarbon liquid from the reacted mixture.

4. The process for manufacture of a tetramethyllead product comprising charging a reaction zone with a charge consisting essentially of monosodium lead alloy, toluene in the proportions of about 10 to 20 parts to 100 parts of lead, and an aluminum catalyst in the proportions of at least about two parts by weight of aluminum to 1,000 parts by weight of lead, said catalyst being selected from the group consisting of trimethyl aluminum, triethyl aluminum, methyl aluminum sesquichloride, dimethyl aluminum chloride, aluminum chloride, aluminum bromide, aluminum iodide, and aluminum, the charge being in the proportions of from about 20 to about 60 pounds of lead per cubic foot of space in the reaction zone, and heating and feeding methyl chloride only thereto in the proportions of at least about 26 parts of methyl chloride per 100 parts of alloy, plus sufficient methyl chloride to occupy as vapor the vapor space of the reaction zone and associated equipment, up to about 60 parts of methyl chloride per 100 parts of alloy reacting the methyl chloride and alloy at a mean temperature of 85 to 110 C., for a reaction period of more than about seven hours to produce tetramethyllead, then discharging the so-formed reaction mixture and then concurrently steam distilling the tetramethyllead and hydrocarbon liquid from the reacted mixture.

5. The process for manufacture of a tetramethyllead product comprising charging a reaction zone with a charge consisting essentially of monosodium lead alloy, an inert aromatic type hydrocarbon liquid having an atmospheric mid-boiling point of from about 110 to 150° C., and in the proportions of about 5 to 20 parts to 100 parts of lead, an aluminum type catalysts in the proportions of at least two parts by weight of the aluminum to 1,000 parts by weight of lead, said catalyst being selected from the group consisting of trimethyl aluminum, triethyl aluminum, methyl aluminum sesquichloride, dimethyl aluminum chloride, aluminum chloride, aluminum bromide, aluminum iodide, and aluminum, and methyl chloride in the proportions of at least about 20 percent excess plus sufficient methyl chloride to occupy as vapor the vapor space of the reaction zone, up to about 160 percent excess the alloy being charged in the proportions of from about 20 to 60 pounds of lead per cubic foot of the reaction zone, and heating said charge and initiating reaction, and continuing the reaction of the methyl chloride and alloy at a mean temperature of 85 to 110° C., for a reaction period of not more than about seven hours and uder the autogenous pressure of the reaction mixture, then discharging the reacted mixture from the reaction zone and then concurrently steam distilling therefrom the tetramethyllead and aromatic liquid.

6. A process for manufacture of tetramethyllead product comprising charging a reaction zone with a charge consisting essentially of monosodium lead alloy, toluene in the proportions of about 10 to 20 parts to 100 parts of lead, an aluminum type catalyst in the proportions of at least two parts by weight of the aluminum to 1,000 parts by weight of lead, said catalyst being selected from the group consisting of trimethyl aluminum, triethyl aluminum, methyl aluminum sesquichloride, dimethyl aluminum chloride, aluminum chloride, aluminum bromide, aluminum iodide, and aluminum, and methyl chloride in the proportions of at least about 20 percent excess plus sufficient methyl chloride to occupy as vapor the vapor space of the reaction zone, up to about 160 percent excess, the alloy being charged in the proportions of from about 20 to 60 pounds of lead per cubic foot of the reaction zone, and heating said charge and initiating reaction, and continuing the reaction of the methyl chloride and alloy at a mean temperature of 85 to 110° C., for a reaction period of not more than about seven hours and under the autogenous pressure of the reaction mixture, then discharging the reacted mixture from the reaction zone and then concurrently steam distilling therefrom the tetramethyllead and toluene.

References Cited in the file of this patent

UNITED STATES PATENTS

| | | |
|---|---|---|
| 1,749,567 | Daudt | Mar. 4, 1930 |
| 2,270,109 | Calingaert et al. | June 13, 1942 |

UNITED STATES PATENT OFFICE
CERTIFICATE OF CORRECTION

Patent No. 3,049,558　　　　　　　　　　　　August 14, 1962

Shirl E. Cook et al.

It is hereby certified that error appears in the above numbered patent requiring correction and that the said Letters Patent should read as corrected below.

In the grant, line 3, and in the heading to the printed specification, lines 4 and 5, for "a corporation of New York", each occurrence read -- a corporation of Delaware --; column 14, line 2, after "of", second occurrence, insert -- not --; line 13, for "catalysts" read -- catalyst --; column 14, line 28, for "uder" read -- under --.

Signed and sealed this 22nd day of October 1963.

(SEAL)
Attest:

ERNEST W. SWIDER
Attesting Officer

EDWIN L. REYNOLDS

Acting Commissioner of Patents